(12) United States Patent
Ferlitsch

(10) Patent No.: US 7,911,626 B2
(45) Date of Patent: Mar. 22, 2011

(54) SYSTEMS AND METHODS FOR PROVIDING A CONFIGURABLE USER INTERFACE ON AN IMAGING DEVICE

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 970 days.

(21) Appl. No.: 10/983,494

(22) Filed: Nov. 8, 2004

(65) Prior Publication Data

US 2006/0098221 A1    May 11, 2006

(51) Int. Cl.
*G06F 3/12* (2006.01)

(52) U.S. Cl. ...... 358/1.13; 345/172; 345/173; 358/1.15; 715/744; 715/745; 715/746; 715/749; 715/762; 715/763; 715/765; 715/825; 715/826

(58) Field of Classification Search .................. 345/172, 345/173; 358/1.13, 1.14, 1.15; 715/744, 715/745, 746, 749, 762, 763, 765, 825, 826
See application file for complete search history.

(56) References Cited

U.S. PATENT DOCUMENTS

| | | | | |
|---|---|---|---|---|
| 5,045,880 A | * | 9/1991 | Evanitsky et al. | 399/82 |
| 5,121,477 A | * | 6/1992 | Koopmans et al. | 715/762 |
| 5,579,481 A | * | 11/1996 | Drerup | 345/179 |
| 5,699,494 A | | 12/1997 | Colbert et al. | |
| 5,847,953 A | * | 12/1998 | Sojoodi et al. | 700/83 |
| 5,907,319 A | | 5/1999 | Hashimoto et al. | |
| 6,002,395 A | * | 12/1999 | Wagner et al. | 715/763 |
| 6,075,519 A | * | 6/2000 | Okatani et al. | 345/173 |
| 6,118,433 A | * | 9/2000 | Jenkin et al. | 345/173 |
| 6,154,210 A | | 11/2000 | Anderson | |
| 6,222,540 B1 | * | 4/2001 | Sacerdoti | 345/581 |
| 6,429,885 B1 | * | 8/2002 | Saib et al. | 715/854 |
| 6,460,040 B1 | * | 10/2002 | Burns | 707/10 |
| 6,489,972 B1 | * | 12/2002 | Escandon et al. | 715/771 |
| 6,545,669 B1 | * | 4/2003 | Kinawi et al. | 345/173 |
| 6,618,061 B2 | * | 9/2003 | Yamamoto | 715/817 |
| 6,690,981 B1 | * | 2/2004 | Kawachi et al. | 700/83 |
| 6,692,167 B2 | * | 2/2004 | Nakadaira et al. | 400/61 |
| 6,940,494 B2 | * | 9/2005 | Hoshino et al. | 345/173 |
| 6,976,222 B2 | * | 12/2005 | Sojoodi et al. | 715/763 |
| 6,977,753 B2 | * | 12/2005 | Pappalardo et al. | 358/1.9 |
| 7,336,912 B2 | * | 2/2008 | Yamauchi et al. | 399/82 |
| 7,353,234 B2 | * | 4/2008 | Kimball et al. | 1/1 |
| 7,408,658 B2 | * | 8/2008 | Twede | 358/1.15 |
| 2003/0011640 A1 | | 1/2003 | Green et al. | |
| 2005/0039125 A1 | * | 2/2005 | Katano | 715/700 |
| 2005/0281577 A1 | * | 12/2005 | Tamura et al. | 399/81 |

FOREIGN PATENT DOCUMENTS

JP    8-307570    11/1996

\* cited by examiner

*Primary Examiner* — King Y Poon
*Assistant Examiner* — Richard Zhu
(74) *Attorney, Agent, or Firm* — Austin Rapp & Hardman

(57) ABSTRACT

Systems and methods for providing a configurable user interface on an imaging device are disclosed. An exemplary system includes an imaging device. The imaging device includes a processor and memory in electronic communication with the processor. Instructions are stored in the memory. The instructions are executable to implement a method to provide a configurable user interface. A user interface edit mode is entered. A part of the user interface is presented to a user for modification. User input is received from the user to modify the part of the user interface. The part of the user interface with the modification is then saved. The user interface edit mode is exited, and the user interface that includes the modification made by the user is presented.

11 Claims, 9 Drawing Sheets

SYSTEMS AND METHODS FOR PROVIDING A CONFIGURABLE USER INTERFACE ON AN IMAGING DEVICE

TECHNICAL FIELD

The present invention relates generally to imaging devices. More specifically, the present invention relates to systems and methods for providing a user-configurable user interface on an imaging device.

BACKGROUND

Imaging devices are frequently used in many aspects of business, industry and academic endeavors. The term "imaging," as used herein, should be interpreted broadly to include any process for producing a copy of a document onto paper, a computer screen, an electronic image, or the like. Examples of imaging devices include printers, facsimile devices, copiers, scanners, display monitors, multi-function peripherals (MFPs), filing devices, web publishing devices, imagesetters, platesetters, and so forth. Documents which are sent to a printing device for printing are sometimes referred to as print jobs.

Imaging devices typically include a user interface through which a user may enter commands, view information, etc. A user interface on an imaging device may include buttons, a display, a touch screen, etc. Typically the user interface on an imaging device is on the front panel of the imaging device. Additionally, the user interface may be remotely accessible, such as from a web browser.

As imaging devices continue to be programmed with additional capabilities, the information that is accessible from the user interface at the imaging device grows. Many user interfaces of imaging devices today include menus that are navigated through the use of buttons and the display. Typically there are a number of such menus for different parts of the user interface.

When a user operates an imaging device, the operations panel controls may not be in a presentation format that is most convenient to the user or organization. Thus, there is a desire for an even more convenient method to access and operate controls from the front panel or remote interface of an imaging device. Benefits may be realized by improved systems and methods for providing a user-configurable user interface on an imaging device

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
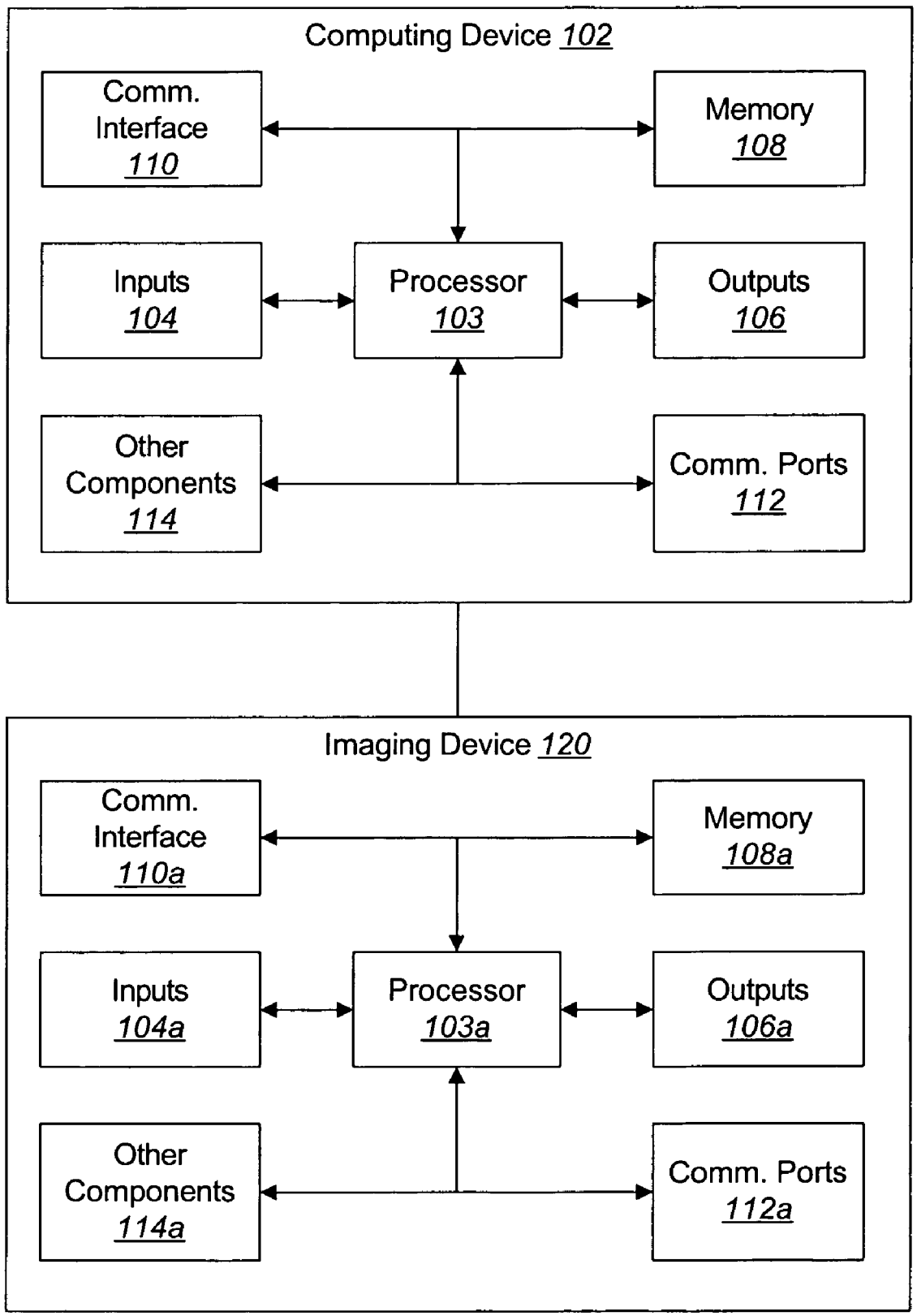
FIG. 1 is a block diagram illustrating the major hardware components typically utilized with embodiments herein.

Systems and methods for providing a configurable user interface on an imaging device are disclosed. An exemplary system includes an imaging device. The imaging device includes a processor and memory in electronic communication with the processor. Instructions are stored in the memory. The instructions are executable to implement a method to provide a configurable user interface. A user interface edit mode is entered. A part of the user interface is presented to a user for modification. User input is received from the user to modify the part of the user interface. The part of the user interface with the modification is then saved. The user interface edit mode is exited, and the user interface that includes the modification made by the user is presented.

The imaging device may include, but is not limited to, a printer, a facsimile device, a copier, a scanner, a display monitor, an imagesetter, a platesetter, an image store, a filing device, a web publishing device, and a multi-function peripheral device. The imaging device may also include an embedded web page and web server.

The imaging device may also include a touch panel. Editing controls may also be provided for the user to use in modifying the part of the user interface. The editing controls may include a scroll control, a tab control, a cut control, a copy control and a paste control.

In an embodiment, user interface configuration data may be stored in the memory that defines at least a portion of the user interface. The user interface configuration data may be sent to a computing device in electronic communication with the imaging device so that the part of the user interface is presented to the user on the computing device for modification. The user input is received from the user at the computing device and then transmitted to the imaging device such that the user input is then received at the imaging device. Alternatively, the user interface configuration data may be sent to a computing device in electronic communication with the imaging device so that the user interface may be remotely edited by a user. The user input is received from the user at the computing device to modify the user interface and new user interface configuration data is then transmitted from the computing device to the imaging device. The imaging device saves the new user interface configuration data to save the part of the user interface with the modification.

In certain embodiments, the user interface configuration data may be read from the memory before the part of the user interface is presented and then saved to the memory after receiving the user input.

In an imaging device, a method is also disclosed for providing a configurable user interface. A user interface edit mode is entered. A part of the user interface is presented to a user for modification. User input is received from the user to modify the part of the user interface. The part of the user interface with the modification is then saved. The user interface edit mode is exited, and the user interface that includes the modification made by the user is presented.

A computer-readable medium for storing program data is also disclosed. The program data comprises executable instructions for implementing a method in an imaging device for providing a configurable user interface. A user interface edit mode is entered. A part of the user interface is presented to a user for modification. User input is received from the user to modify the part of the user interface. The part of the user interface with the modification is then saved. The user interface edit mode is exited, and the user interface that includes the modification made by the user is presented.

In certain embodiments the part of the user interface is presented through the use of a touch panel. In addition, the user input may be received by the user through editing controls.

An embodiment also includes presenting an option to the user to select a new user interface. User input is received from the user to select the new user interface. The new user interface is presented that was selected by the user.

Various embodiments of the invention are now described with reference to the Figures, where like reference numbers indicate identical or functionally similar elements. It will be readily understood that the embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network, or by separate microprocessors in the same physical location, such as in a multi-core chip. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 is a block diagram illustrating the major hardware components typically utilized with embodiments herein. The systems and methods disclosed may be used with a computing device 102 and an imaging device 120. Computing devices 102 are known in the art and are commercially available. The major hardware components typically utilized in a computing device 102 are illustrated in FIG. 1. A computing device 102 typically includes a processor 103 in electronic communication with input components or devices 104 and/or output components or devices 106.

The processor 103 controls the operation of the computing device 102 and may be embodied as a microprocessor, a microcontroller, a digital signal processor (DSP) or other device known in the art. The processor 103 typically performs logical and arithmetic operations based on program instructions stored within the memory 108.

The processor 103 is operably connected to input 104 and/or output devices 106 capable of electronic communication with the processor 103, or, in other words, to devices capable of input and/or output in the form of an electrical signal. Embodiments of devices 102 may include the inputs 104, outputs 106 and the processor 103 within the same physical structure or in separate housings or structures. Examples of different kinds of input devices 104 include a keyboard, mouse, microphone, remote control device, button, joystick, trackball, touchpad, lightpen, etc. Examples of different kinds of output devices 106 include a speaker, printer, etc. One specific type of output device which is typically included in a computer system is a display device (not shown). Display devices used with embodiments disclosed herein may utilize any suitable image projection technology, such as a cathode ray tube (CRT), liquid crystal display (LCD), light-emitting diode (LED), gas plasma, electroluminescence, or the like. A display controller may also be provided, for converting data stored in the memory 108 into text, graphics, and/or moving images (as appropriate) shown on the display device.

The computing device 102 may also include memory 108. The memory 108 may be a separate component from the processor 103, or it may be on-board memory 108 included in the same part as the processor 103. For example, microcontrollers often include a certain amount of on-board memory. As used herein, the term "memory" 108 is broadly defined as any electronic component capable of storing electronic information, and may be embodied as read only memory (ROM), random access memory (RAM), magnetic disk storage media, optical storage media, flash memory devices in RAM, on-board memory included with the processor 103, EPROM memory, EEPROM memory, registers, etc. The memory 108 typically stores program instructions and other types of data. The program instructions may be executed by the processor 103 to implement some or all of the methods disclosed herein.

The processor 103 is also in electronic communication with a communication interface 110. The communication interface 110 may be used for communications with other devices 102, imaging devices 120, servers, etc. Thus, the communication interfaces 110 of the various devices 102 may be designed to communicate with each other to send signals or messages between the computing devices 102. The communication interfaces 110 may be based on wired communication technology, wireless communication technology, or both. Examples of different types of communication interfaces 110 include a serial port, a parallel port, a Universal Serial Bus (USB), an Ethernet adapter, an EEE 1394 bus interface, a small computer system interface (SCSI) bus interface, an infrared (IrDA) communication data port, a Bluetooth wireless communication adapter, and so forth.

The computing device 102 may also include other communication ports 112. In addition, other components 114 may also be included in the electronic computing device 102.

Many kinds of different devices may be used with embodiments herein. The computing device 102 may be a one-chip computer, such as a microcontroller, a one-board type of computer, such as a controller, a typical desktop computer, such as an IBM-PC compatible, a Personal Digital Assistant (PDA), a communication device such as a cell phone, a Unix-based workstation, an Apple computer, etc. Accordingly, the block diagram of FIG. 1 is only meant to illustrate typical components of a computing device 102 and is not meant to limit the scope of embodiments disclosed herein.

The computing device 102 is in electronic communication with the imaging device 120. An imaging device 120 is a device that receives or transmits an imaging job, such as a Multi-Function Peripheral ("MFP") or computing device. Imaging devices include, but are not limited to, physical printers, multi-functional peripherals, a printer pool, a printer cluster, a fax machine, a plotter, a scanner, a copier, a logical device, a computer monitor, a file, an electronic whiteboard, a document server, web publishing device, etc. The imaging device may be a single or a plural grouping (e.g., pool or cluster) of two or more devices.

The imaging device 120 is a type of computing device. Thus, the illustrated components of the computing device 102 may also be typical of the components often found in an imaging device 120. The imaging device 120 typically includes its own processor 103a, memory 108a, inputs 104a, outputs 106a, etc., as illustrated.

In light of the definition of an imaging device 120 above, the term imaging job, as used herein, is broadly defined as any instruction or set of instructions that are sent to an imaging device to cause an image to be printed, imaged, copied, scanned, sent, filed, published, etc., to or from the imaging device 120. Thus, the term imaging job includes, but is not limited to, a fax instruction or job to send a fax, a print job to print to a file, a print job to print to a particular window in a graphical user interface, a copy job to copy a document or image, a scan job to scan in an image from a scanner, a print job to print to a physical printer, a document filing job, a document manipulation job, a document conversion job, a web publishing job, etc. Copy jobs and copier devices are used to illustrate exemplary embodiments, but other kinds of imaging jobs and imaging devices may be used in implementations of the embodiments disclosed herein.

Figure 2:
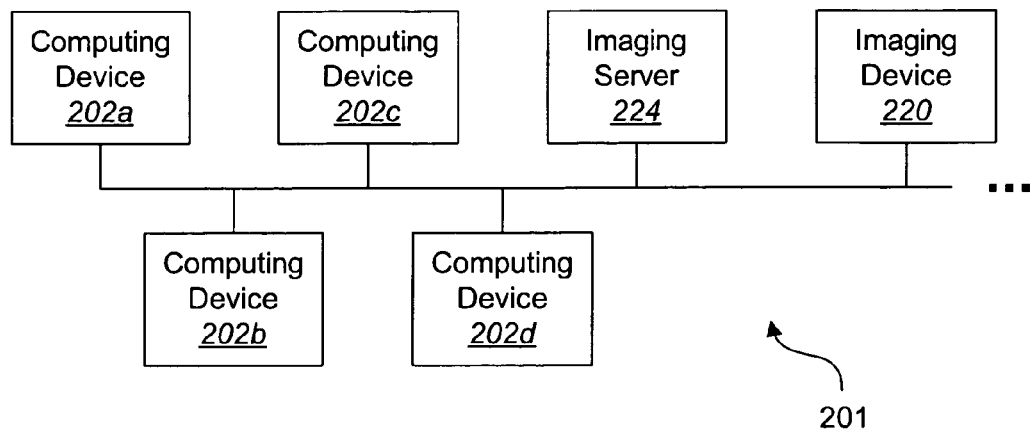
FIG. 2 is a network block diagram illustrating one possible environment in which the present systems and methods may be implemented.

FIG. 2 is a network block diagram illustrating one possible environment in which the present systems and methods may be implemented. The present systems and methods may also be implemented on a standalone computer system. FIG. 2 illustrates a computer network comprising a plurality of computing devices 202, an imaging device 220 and an imaging server 224.

This invention is independent of the job control command and image data language and syntax. For example, the job control language may be PJL or XML/SOAP and the imaging job data language may be PCL or Postscript.

Herein, reference to computing devices that construct and despool an imaging job to, or receive from, either an imaging device or server, will be referred to as imaging clients. Herein, reference to computing devices that manage an imaging device and receive imaging jobs and respool the imaging job to/from an imaging device, will be referred to as imaging servers.

References to computing devices that construct and despool an imaging job to either an imaging device or server, will be referred to as client computing devices (i.e., client). Herein, reference to computing devices that centrally manage a shared imaging device by receiving despooled imaging jobs from multiple client computing devices and re-despools the imaging job to the imaging device, will be referred to as server computing devices (i.e., server).

The embodiments disclosed operate independently of how the imaging job is initiated. For example, a copy job may be initiated by an application using a driver which spools a copy job to the spooler. By way of further example, the copy job may be initiated at the operations panel (e.g., front panel) of the imaging device.

The systems and methods herein are independent of the method to initiate the imaging job and the method to despool the image job and/or imaging result to/from the imaging client and imaging device.

The systems and methods of embodiments herein typically comprise one or more scanning/copying or multi-functional peripheral (MFP) devices, which may be connected locally, through a network or through a remote scanning/copying environment.

The definitions in this and subsequent paragraphs apply throughout this specification and related claims. The term copy job may refer to any combination of data that can be copied, i.e., reproduced in some fashion. The term "scan job" may refer to any combination of data that can be scanned image data. Scanned image data may comprise a single or multiple bitmap images, or be additionally decomposed into non-bitmap components such as text and line/art.

The term "network" may refer to any combination of computing devices and peripherals, such as printing devices, wherein the devices can communicate with each other. The term "network" may comprise Local Area Networks (LANs), Wide Area Networks (WANs) and many other network types. A network may be connected using conventional conductive cable, fiber-optic cable, phone line cable, power line cable or other electrical and light conductors and other signal transmission media as well as wireless connections using infrared, RF or other wireless methods.

Embodiments may be embodied in software, firmware, hardware and other forms that achieve the function described herein. As embodiments may be adapted to many environments with varying computing devices, operating systems, printing devices, network hardware and software, applications and other variables, these embodiments may take many forms to achieve their function. Some embodiments may also be transmitted as signals, for example, and not by way of limitation, embodiments may be transmitted as analog or digital electrical signals or as light in a fiber-optic line. All of these embodiments are to be considered within the scope of the present invention.

When a user operates a digital imaging device, such as a multi-function peripheral (MFP) as a walkup operation (e.g., copy, scan, document server), the front panel controls may not be in a presentation format that is seen as convenient to the user or organization. Traditionally, control and operation from the front panel (e.g., control panel, operator's panel, etc.) of an imaging device, such as an MFP, have been limiting and non-flexible. Traditional MFPs offered the user control over the device through hard-wired buttons on a control panel and a display (e.g., LCD) which indicated the actions they took. This method is limiting in that the hard-wired buttons consume significant space on the device. Thus, providing a rich set of actions was impractical due to a number of reasons including (1) insufficient space on the device, (2) visual complexity when a large number of buttons are laid out (i.e., flat panel), or (3) mental complexity when a fewer number of buttons are overloaded for multiple functions, such as implementing a function as a combination of button pressing or overloading a key with two or more functions using a function shift key. The Sharp AR-275N digital imager is an example of a device that uses this traditional front panel user interface.

Some improvement to the above problems can be seen in conventional imaging devices by adding an additional keyboard or 10key. The use of the keyboard or 10key allows controls that accept variable input, such as passwords, fax phone numbers, etc. The keyboard may also be used for programmatic functions. Adding a keyboard or 10key still has limitations in that to reduce the number of hard-coded buttons, additional control features must be represented in a programmatic manner, which often results in additional mental complexity. The Sharp AR-M450 digital imager is an example of a device that uses this conventional front panel user interface.

More recent digital imaging devices have made significant improvements to the complexity issue for a rich number of control features by moving to a touch panel interface. In this method, the display becomes an interactive control device. Buttons (controls) are emulated as dialogs on the display device (i.e., soft controls). The user then interacts with the display device through a combination of touching the soft controls on the display and entering variable input using a keyboard or 10key. Overcrowding of controls is solved by partitioning the soft controls into multiple display panels, where one display panel is emulated on the touch panel at a time, and the user has a means to scroll through the various panels (e.g., menus).

Using a touch panel interface as an interactive control device helps alleviate the overcrowding problem and mental complexity, however it does not fully address the visual complexity. That is, the user may have difficulty in locating controls on display panels that are not currently displayed on the touch panel. Generally, the display panels are traversed in a hierarchical manner and must be traversed in a recursive manner. Thus the user may traverse through a repetition of display panels to locate the one of interest, possibly become confused and eventually may give up. Even when the user does know the location of the display panel, the display panel may be very deep in the hierarchy. Navigating to a display panel deep in the hierarchy may become very tedious for the user. The Sharp AR-M277 digital imager is an example of a device that uses this touch panel user interface.

Thus, there is a desire for an even more convenient method to access and operate controls from the front or remote panel of an imaging device for a rich number of functions without a high level of visual and mental complexity. Disclosed herein is an effective method for a user to control an imaging device through a user configurable touch or remote panel interface. Herein, references to a touch panel interface will refer to both a user interface locally accessible at the device, or a configurable remote interface accessible externally to the device, such as by a web browser.

Figure 3:
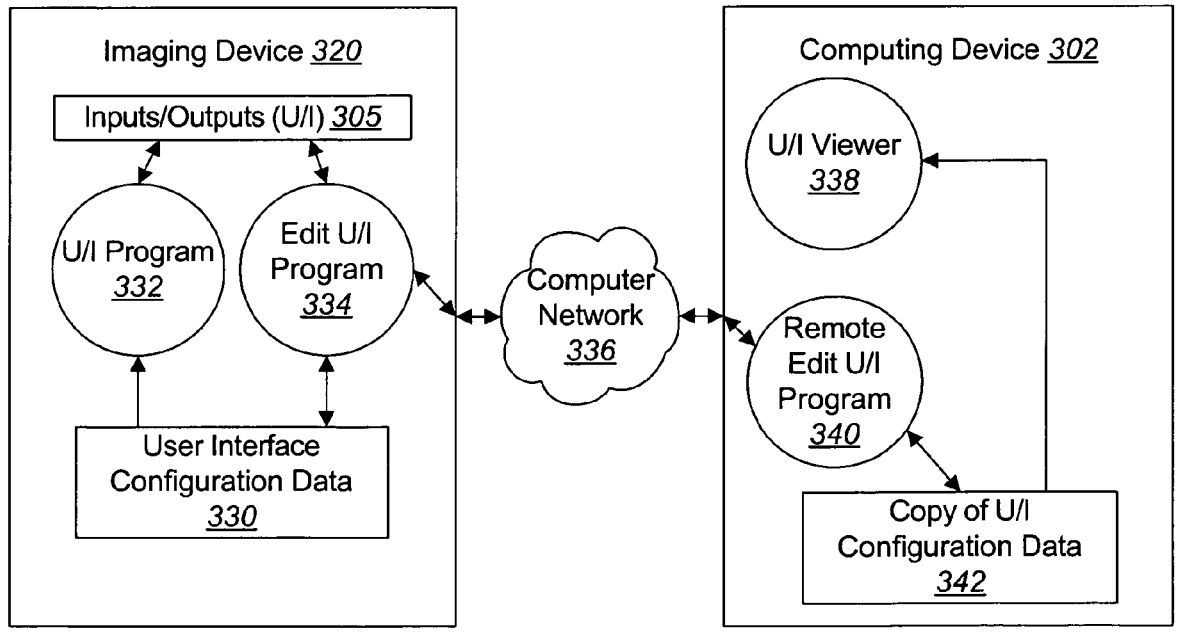
FIG. 3 is a block diagram illustrating one embodiment of a user configurable user interface for an imaging device.

FIG. 3 is a block diagram illustrating one embodiment of a user configurable user interface for an imaging device. An imaging device 320 includes user interface configuration data 330. The user interface configuration data 330 is data that is used to define the user interface 305 that will be presented to the user at the imaging device 320. The user interface configuration data 330 may, in one embodiment, comprise a programmable menu definition that defines the position of a menu (hierarchy), the links (scroll) to next and previous menus, the types of controls, the titles for controls and the actions (callbacks) to associate with controls. An example of one possible programmable menu definition is shown below.

A user interface (U/I) program 332 presents the user interface 305 through use of the user interface configuration data 330. The U/I 305 is presented through the output device, illustrated as part of the inputs/outputs (U/I) component 305. The inputs/outputs component 305 may also be referred to as the U/I 305. Inputs from the user may be entered through the inputs/outputs component 305 and processed by the U/I program 332.

An edit U/I program 334 may be used by the user to configure the U/I 305 for the imaging device 320. The user interface 305 is defined by the user interface configuration data 330. As a result, to change the U/I 305 the edit U/I program 334 modifies the user interface configuration data 330.

The U/I 305 of the imaging device 320 may also be modified remotely through use of a computing device 302. In the embodiment of FIG. 3 the computing device 302 is in electronic communication with the imaging device 320 through a computer network 336. The computing device 302 includes a U/I viewer 338 to view the U/I 305 (or to view part of the U/I 305) on the computing device 302. A copy 342 of the U/I configuration data may be stored on the computing device 302 by simply copying the user interface configuration data 330 from the imaging device 320 to the computing device 302. The edit U/I program 334 of the imaging device 320 may be configured to allow the remote edit U/I program 340 to access the user interface configuration data 330 to make a local copy 342. A user at the computing device 302 may then use the remote edit U/I program 340 to modify the copy 342 of the U/I configuration data. The modified copy 342 may then be transmitted back to the imaging device 320 through the edit U/I program 334, which will cause the new U/I to be used at the imaging device 320.

Figure 4:
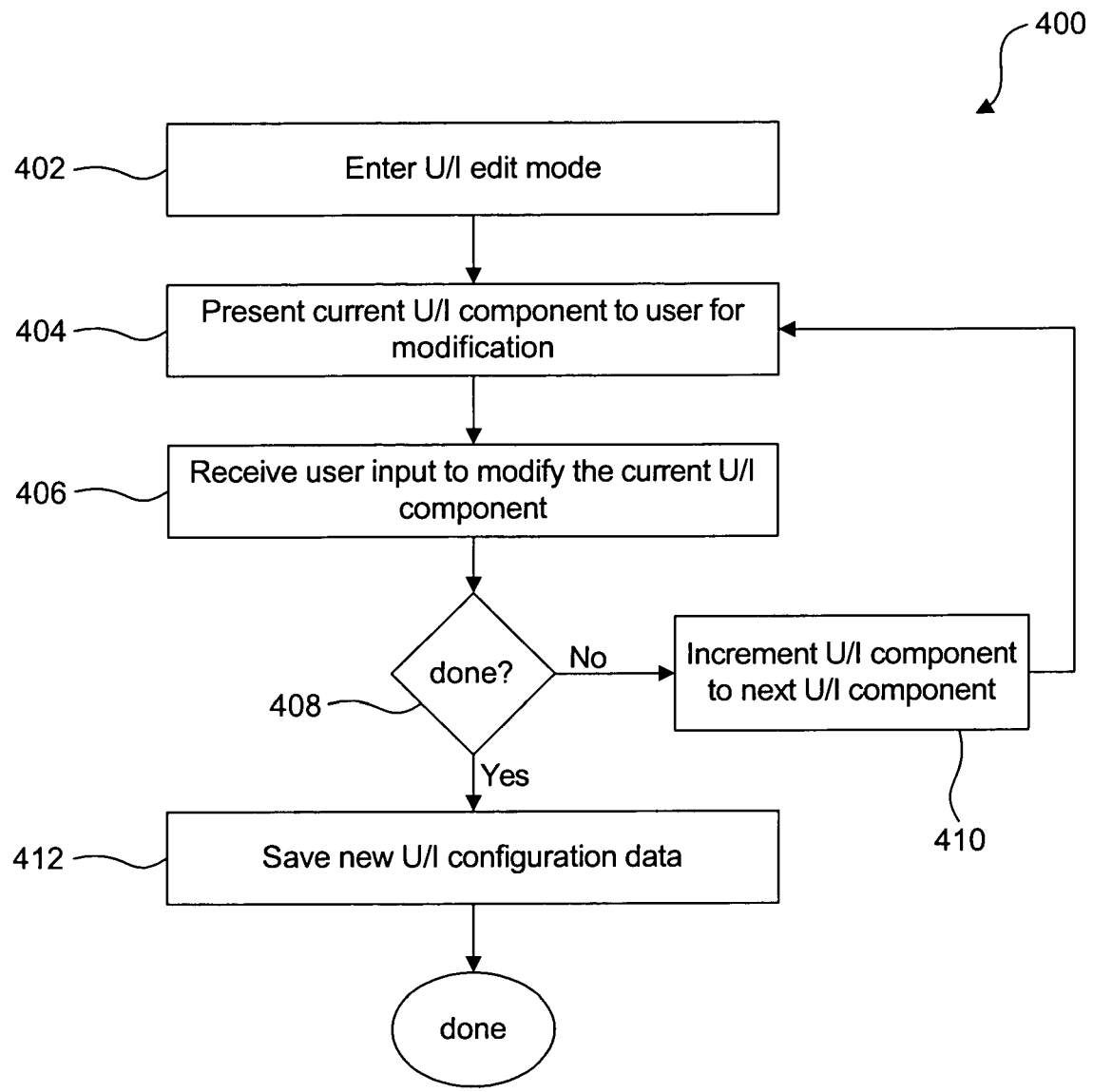
FIG. 4 is a flow diagram illustrating a method for using a user configurable user interface for an imaging device.

FIG. 4 is a flow diagram illustrating a method 400 for using a user configurable user interface for an imaging device. The U/I edit mode is entered 402. This mode may be entered by pressing one or more buttons, by typing in a particular command, by sending a message from a remote device, etc. The current U/I component is presented 404 to a user for modification. The current U/I component is a part of the overall U/I for the imaging device. The current U/I component may be one particular menu, or a part of a menu. The current U/I component may also be a particular touch panel interface, or a part of the touch panel interface. The entire U/I, or at least the part of the U/I that is user-configurable, may be broken up into a plurality of current U/I components in order to present smaller and more manageable pieces of the U/I to the user for possible reconfiguration.

User input to modify the current U/I component is received 406. The method then determines 408 whether the user is done modifying the user interface. Typically this could be done by asking the user through a user interface whether he or she wished to make any further changes. In addition, a "done" button may also be provided which, when pressed, would signal that the user was done making changes to user interface. If the user is not done, then the U/I component is incremented 410 to the next U/I component, and the method returns to the step of presenting 404 the current U/I component to the user for modification. If the user is done, then the new U/I configuration data is saved 412. The new U/I configuration data will then be used to present the new U/I to the user.

Figure 10:
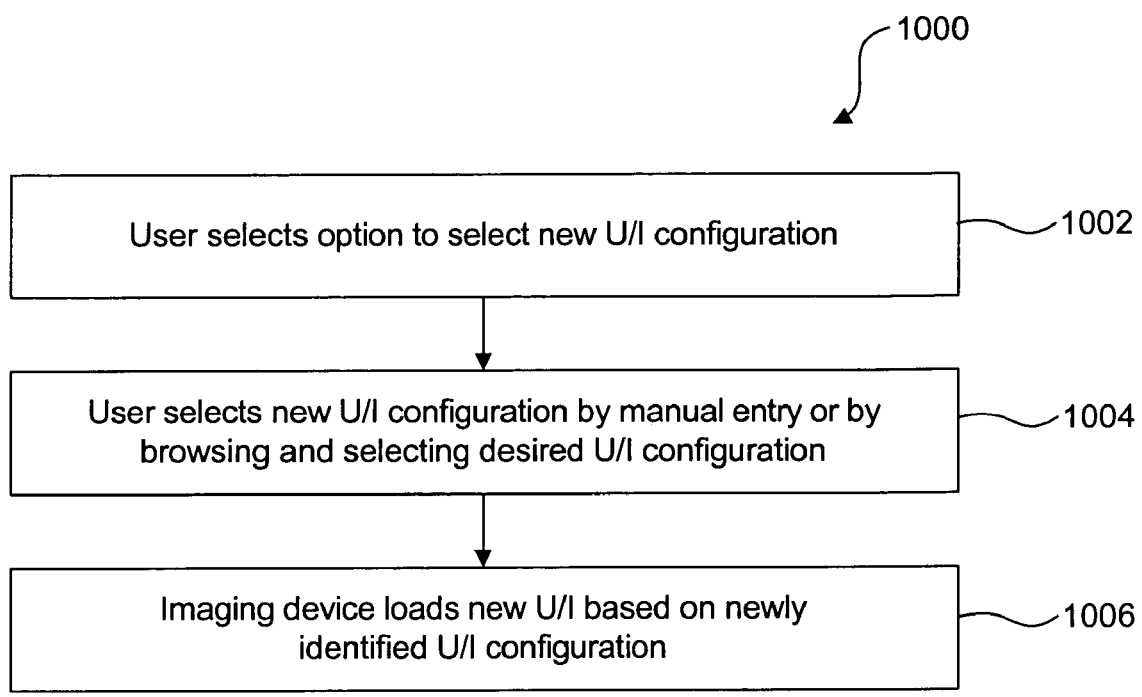
FIG. 10 is an example of a flow diagram illustrating a method for selecting a user configured user interface for an imaging device.

The new U/I configuration data may be saved 412 in various ways, including, but not limited to being saved under a user or group name. For example, using this embodiment, if a particular user wanted to have his or her own U/I configuration data, he or she may save 412 the U/I configuration data under their user name. In addition, it is possible that a user may have more than one U/I configuration data file in which case the user may simply save different U/I configurations under different filenames. The user may then recall the different U/I configurations either by user name, by file name, by browsing all available U/I configuration data files, etc. The imaging device 120 may also be configured such that it automatically recalls the last U/I configuration data file that it was using. FIG. 10 is an example of a flow diagram illustrating a method for selecting a user configured user interface for an imaging device.

In embodiments herein the MFP either directly (e.g., front panel) or through a remote interface (e.g., application running on a host and in communication with the device) has additional controls for editing the presentation of operator controls on the imaging device's touch panel interface. These additional controls allow the user to manipulate the location and captions on controls on the touch panel menu(s) without using controls on the touch panel. These additional controls may include, but are not limited to, (1) a scroll bar for navigating through the touch panel menu hierarchy, (2) tab control for navigating through controls on a touch panel menu, (3) copy/cut/paste controls for relocating controls on and between touch panel menus, and (4) caption control and keyboard for changing captions on controls.

Embodiments herein may also be used to chain controls together to create composite controls. For example, the user could create a new button on the touch panel that is a combination of duplex print and stapling.

Figure 5:
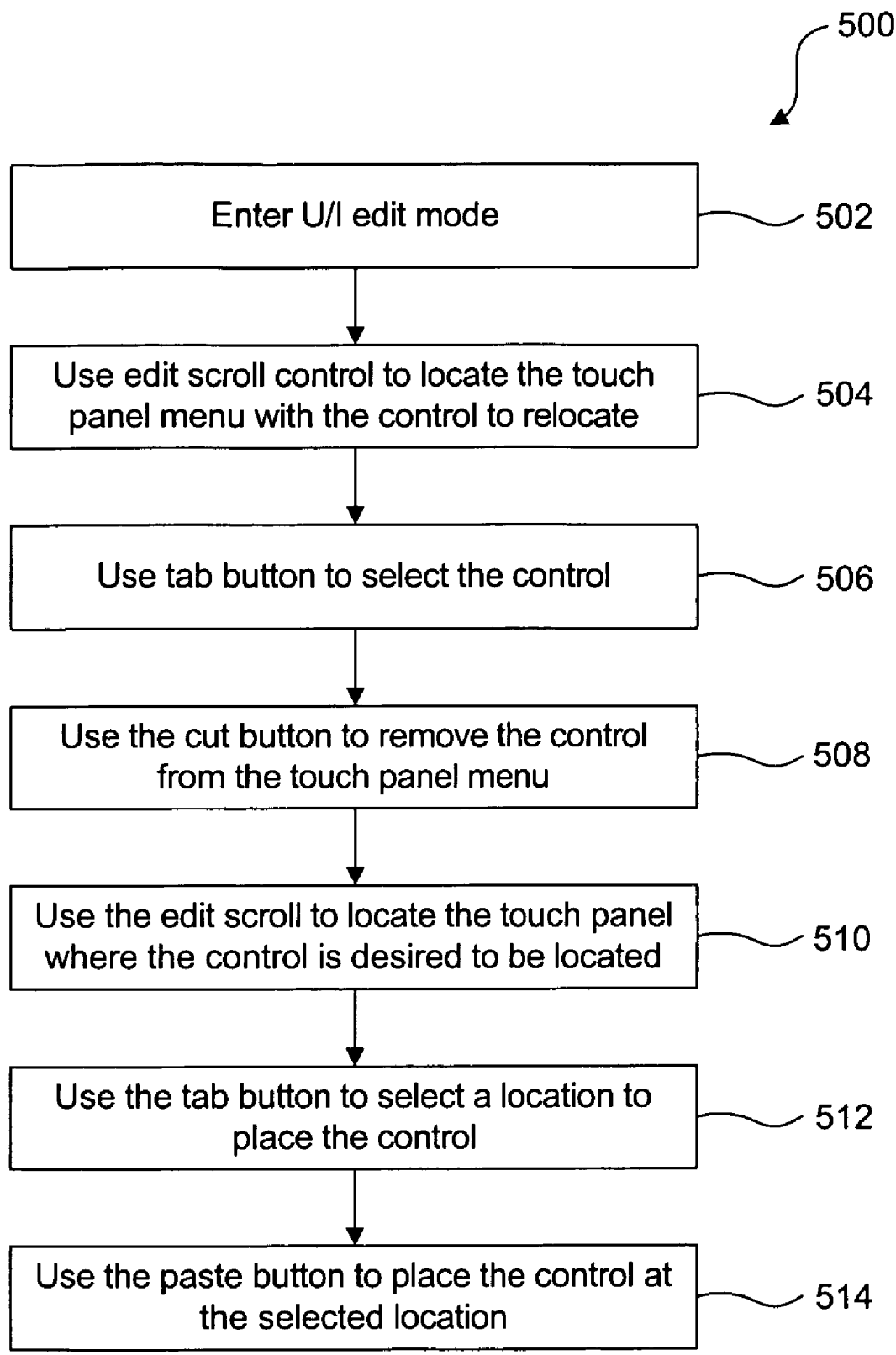
FIG. 5 is a flow diagram illustrating an exemplary method for modifying a user interface through the use of the embodiments disclosed herein.

By way of further example, a particular function (such as tray settings) may contain too many controls to fit on a single touch panel menu. FIG. 5 is a flow diagram illustrating an exemplary method 500 for modifying a user interface through the use of the embodiments disclosed herein. In this case, typically the controls are partitioned across multiple touch panel menus that are chained together and navigated using a scroll control dialog on the menu(s). The user then typically has to touch the scroll dialog multiple times until the desire control is located. In this example, controls that are assumed by the manufacturer to be less used tend to be at the bottom of the hierarchy (such as tray settings for bypass tray). If, in a particular organization, the control tends to be used more frequently, its location could then be moved to a more desirable location as illustrated by the example of FIG. 5. The user enters 502 user interface edit mode (such as a key operator action). The user then uses 504 the edit scroll control to locate the touch panel menu with the control to relocate. The tab button may be used to select 506 the control. Alternatively the user may simply touch the control that is to be relocated. The user uses 508 the cut button to remove the control from the touch panel menu. The user uses 510 the edit scroll control to locate the touch panel menu where the control is desired to be located. Next, the user may use 512 the tab button to select a location where to place the control. Alternatively the user may simply touch the location where the control is to be relocated to. Finally the paste button may be used 514 to place the control at the selected location.

Figure 6:
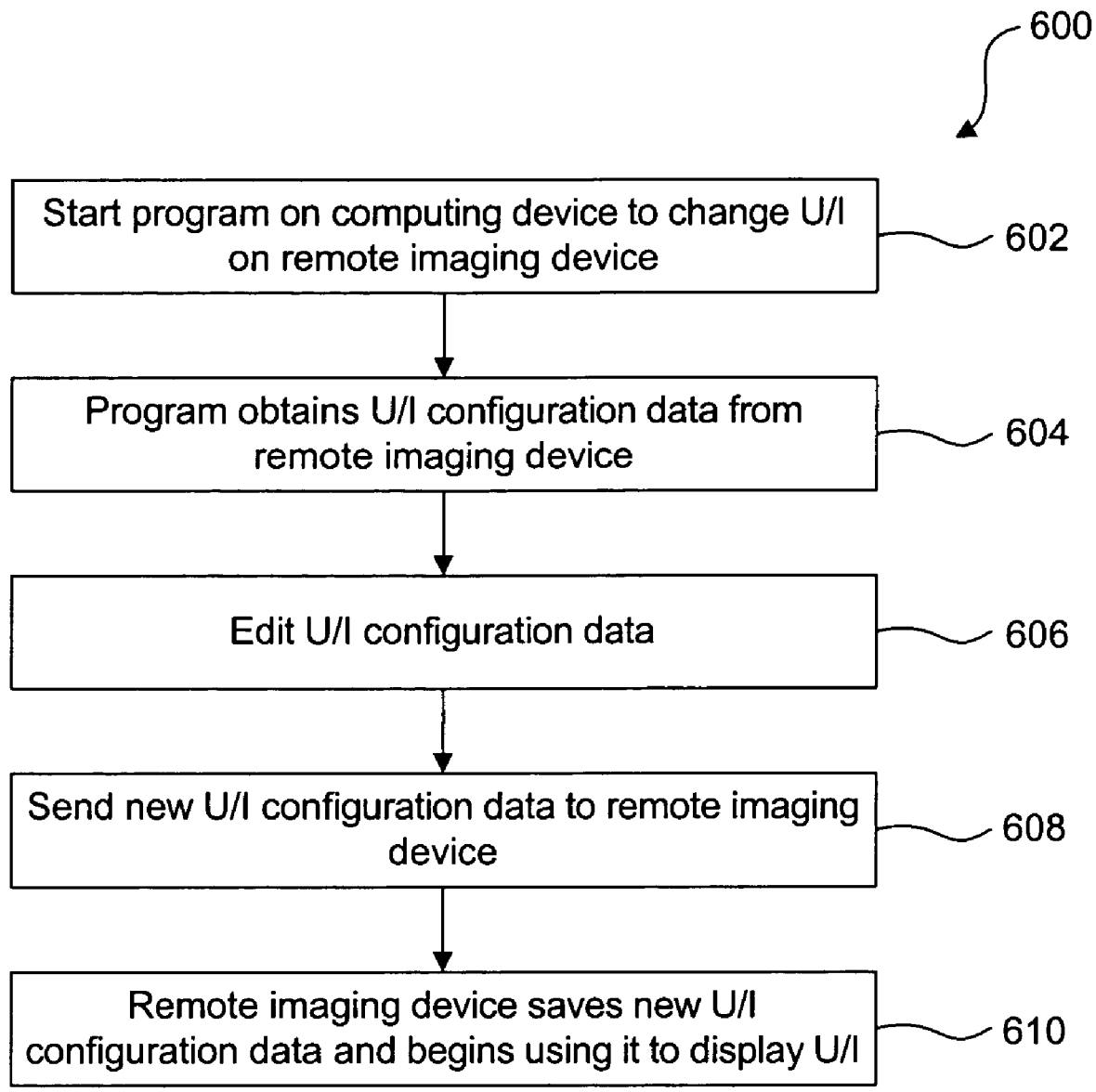
FIG. 6 is a flow diagram of a method for remotely modifying a user interface for an imaging device using the embodiment illustrated in FIG. 3.

FIG. 6 is a flow diagram of a method 600 for remotely modifying a user interface for an imaging device 320 using the embodiment illustrated in FIG. 3. First, a program is started 602 on the computing device 302 to modify or change the U/I 305 on the remote imaging device 320. In one embodiment, the program may be similar to the remote edit U/I program 340 of FIG. 3. The program obtains 604 the U/I configuration data 330 from the remote imaging device 320. The user is then able to edit 606 the U/I configuration data 330. The new U/I configuration data is sent 608 to the remote imaging device 320. Then the remote imaging device 320 saves 610 the new U/I configuration data and begins using it to display the U/I 305.

Figure 7:
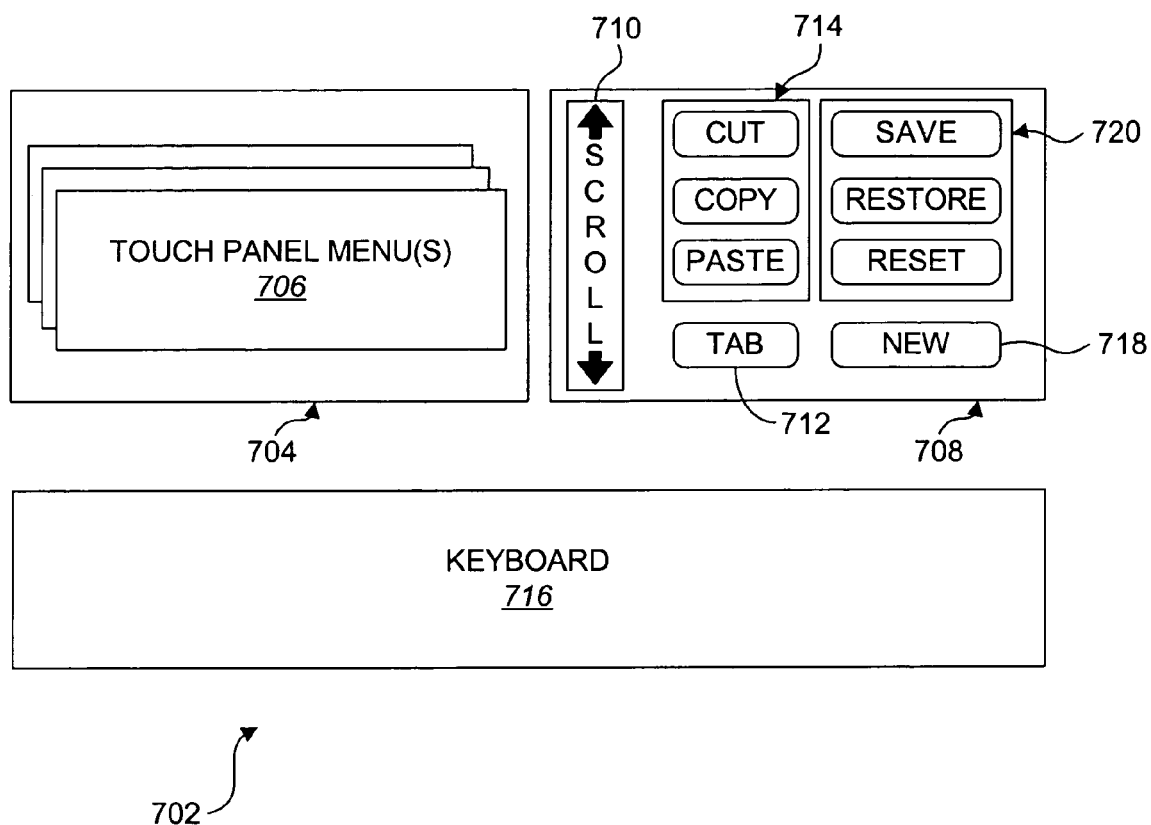
FIG. 7 is an illustration of an embodiment of a configurable touch panel interface that provides front panel editing.

FIG. 7 is an illustration of an embodiment of a configurable touch panel interface 702 that provides front panel editing. In the exemplary environment, an imaging device is controllable from a walkup operations panel 702 (e.g., front panel, control panel) and/or embedded device web page. One component of the operations panel consists of a touch screen 704. The touch screen 704 is typically implemented as an LCD device with a layer that can detect being depressed along a coordinate system mapped on the touch screen 704. The imaging device has a process that displays soft buttons (GUI controls) at specific locations on the touch screens that are associated with specific actions that can be performed by the device (e.g., duplex printing). The touch screen typically has multiple menus 706. The selection of displays may be selected as a result of a hard button on the device, default menus, device state, or selection of a soft button on another menu (i.e., menus chained together).

An additional set of controls 708 (in addition to the touch screen menu 706) are provided for editing the touch screen menus 706. These controls 708 may be implemented in any manner, such as hard buttons on the device, another touch screen, a frame in a web page, a remote GUI interface, such as running on a host, etc.

The editing controls 708 allow the user to manipulate the touch screen 704 independently of the touch screen controls. Examples of editing controls 708 include: scrolling control 710 for scrolling through the touch screen menus, tab control 712 for selecting soft button(s) on the touch screen menus, cut/copy/paste controls 714 for relocating soft buttons, on a menu or across menus, a keyboard 716 for changing captions associated with soft buttons, a new key 718 for creating a new soft-button, save/restore/reset keys 720 to save/restore or return to factory default touch screen menu configurations. Note, a soft button may also be read-only (i.e., display info box such as a list of pending print jobs).

Figure 8:
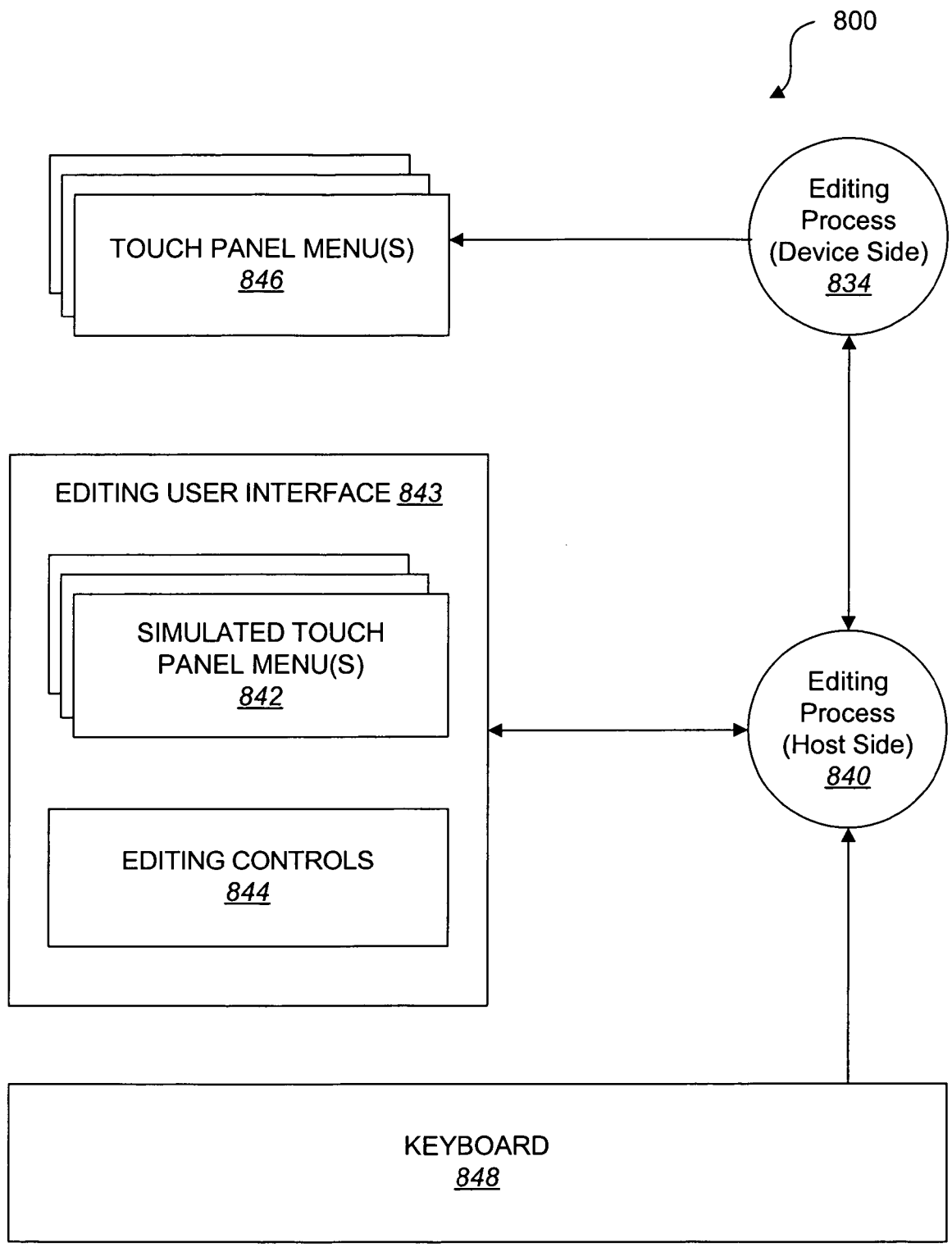
FIG. 8 is a graphical illustration of remotely editing a user interface.

Referring now to FIG. 8, an embodiment 800 that graphically illustrates remotely editing the user interface is shown. In this case, an editing process 834 resides on the imaging device that: (a) transmits the current touch screen configuration(s) to the remote process 840, and (2) modifies the touch screen menu configuration according to the commands committed from the remote process.

A second editing process 840 resides at a remote location, such as a host. The remote editing process 840 has a user interface 843 that consists of two components: (1) a simulating U/I 842 that simulates the display of the current touch screen configuration(s) received from the device, and subsequent edits from the editing process, and (2) an editing U/I 844 that displays the editing controls. The editing U/I process 843, in this embodiment, is considered to include both the editing U/I 844 and the simulating U/I 842.

The user uses the editing controls 844 at the remote process 840 to edit the simulated touch screen menus 842. A keyboard 848, mouse (not shown) or other user input devices may also be used by the user in editing the touch screen menus 842. When the user commits the changes (i.e., new touch screen configuration), the new touch screen configuration is then transmitted from the remote editing process 840 to the device editing process 834. The device editing process 834 then saves the touch screen configuration 846. After this new touch screen configuration 846 is saved, then the imaging device may begin using the new touch screen configuration.

Figure 9:
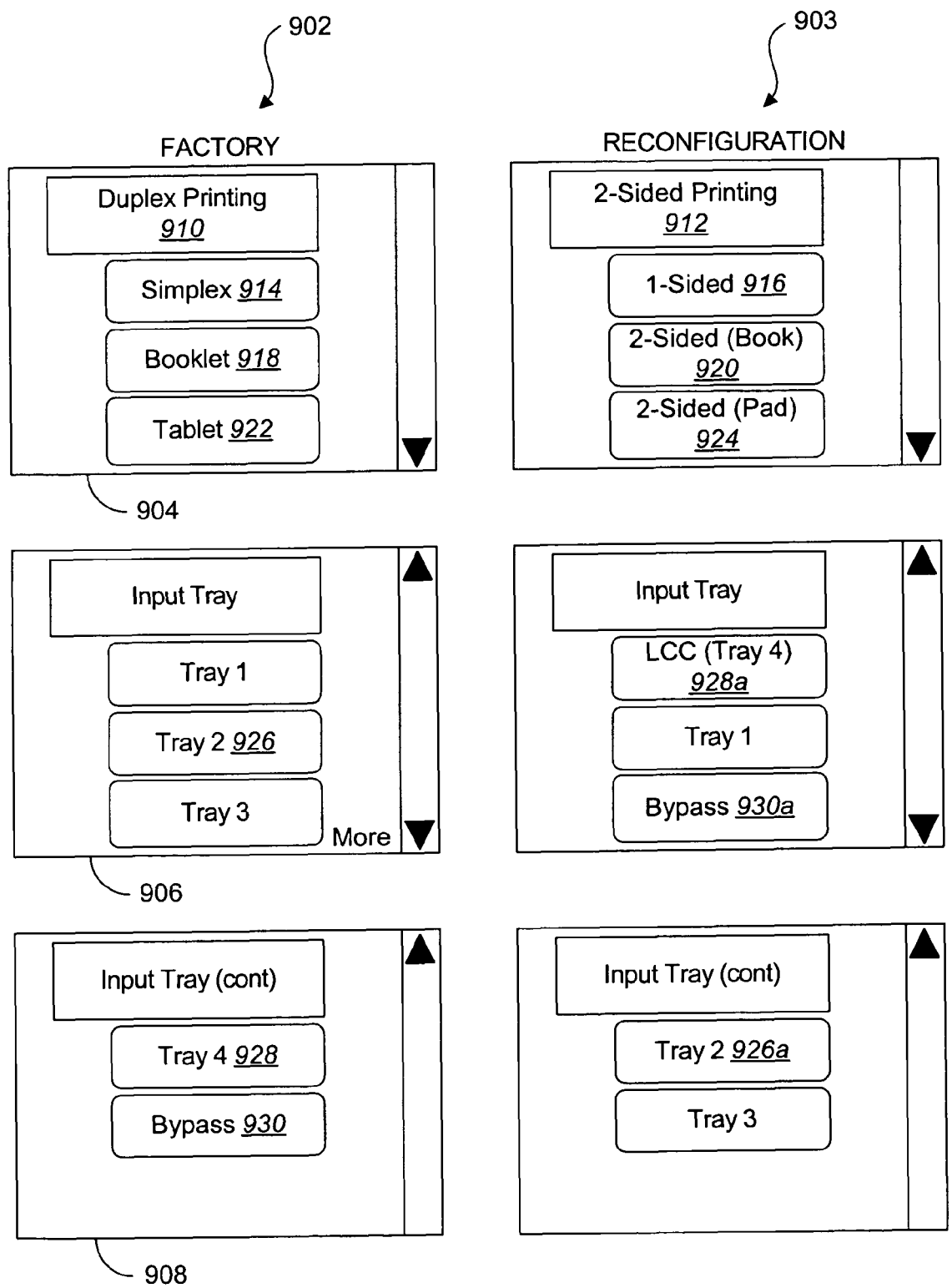
FIG. 9 illustrates an example of a default touch screen menu and the editing of it to provide a reconfigured touch screen menu.

FIG. 9 illustrates an example of a default touch screen menu 902 and the editing of it to provide a reconfigured touch screen menu 903. The left-hand side 902 of FIG. 9 shows an example of a factory preset touch screen 902 configuration of three menus chained together. The right-hand side 903 shows the reconfigured touch screen menu 903 after the following editing has taken place. In the topmost menu 904, the user can select the mode of duplex printing. The user can then use the scroll bar on the touch screen to move to the next menu 906 for specifying the input tray. Note that the number of input tray selections is too great for a single menu and thus the scroll bar is used to move to the third touch screen menu 908 for the remaining tray selections.

In this example, the operator desires to make the following changes to the touch screen menus:

1. Change the captions on the duplex soft buttons of the first touch screen 904 to be more descriptive.
2. Change the caption on the Tray 4 input tray selection to indicate the large capacity tray.
3. Reorder the most commonly used input trays to appear on the first input tray touch screen menu.

In order to make these changes to the touch screen menus, according to one or more embodiments disclosed herein the operator may use the editing controls as follows:

1. Use the tab control (shown in FIG. 7) to select the 'Duplex Printing' title box 910.
2. Use the keyboard (shown in FIG. 7) to change the title to '2-Sided Printing' 912. Note, an additional key/button press (or cursor on a remote U/I) could be used to enter text edit mode, or could be implicitly initiated by typing at the keyboard.
3. Use the tab control to move to the Simplex soft-button 914. Use the keyboard to change the title to '1-Sided' 916.
4. Use the tab control to move to the Booklet soft-button 918. Use the keyboard to change the title to '2-Sided (Book)' 920. Note, an additional key/button press (or cursor on a remote UI) could be used to enlarge the button (for additional text), or could be implicitly enlarged as a result in the larger text length.
5. Use the tab control to move to the Tablet soft-button 922. Use the keyboard to change the title to '2-Sided (Pad) 924.
6. Use the scroll control to move to the 2nd touch screen menu 906. Use the tab control to select the tray 2 soft-button 926 and the cut control (shown in FIG. 7) to remove the button.
7. Use the scroll control to move to the 3rd touch screen menu 908. Use the paste control (shown in FIG. 7) to paste in the tray 2 926a soft-button.
8. Use the tab control to select both the Tray 4 928 and Bypass soft-buttons 930 and use the cut control to remove the buttons.
9. Use the scroll control to move to the 2nd touch screen menu 906. Use the paste control to paste in the Tray 4 928a and Bypass buttons 930a.
10. Use the keyboard to change the title of 'Tray 4' to 'LCC (Tray 4)' 928a.
11. Use the save control (shown in FIG. 7) to commit the changes.

The method may also use selecting multiple items at a time, scratch pads, and allowing the saving and applying of more than one reconfiguration.

The following example illustrates a programmable menu definition. In this embodiment, the display and control of the touch screen menus is defined by a programmable menu definition. The definition allows the definition of at least:

1. Position of menu (hierarchy)
2. Links (scroll) to next and previous menus.
3. Type of controls.
4. Titles for controls.
5. Actions (callbacks) to associate with controls.

Below is an example syntax of a touch screen definition. The following is an example only and does not limit the inventive principles and embodiments herein.

```
<Menu, rank=1>
    <control=readonly,
        title=Duplex Printing>
    <control=button,
        title=Simplex,
        action=&set_single_sided>
    <control=button,
        title=Booklet,
        action=&set_double_sided_longedge>
    <control=button,
        title=Tablet,
        action=&set_double_sided_longedge>
    <scroll,
        prev=null,
        next=2>
</Menu>
```

FIG. 10 is an example of a flow diagram illustrating a method 1000 for selecting a user configured user interface for an imaging device. As discussed above, new U/I configuration data may be saved 412 in various ways, including, but not limited to being saved under a user or group name. Using this embodiment a user may then select a particular user interface to use on the imaging device. The user selects 1002 an option to select a new U/I configuration. Then the user selects 1004 the new U/I configuration to use. The user may select 1004 the new U/I configuration in various ways including, but not limited to, manually entering its name, browsing the available configurations and selecting the desired configuration, by entering his or her user name, etc. The imaging device then loads 1006 the new U/I based on the newly identified U/I configuration.

Other embodiments include operating the editing process as a remote U/I on any operating system, such as the Microsoft Windows Operating System, the Apple Macintosh Operating System, the Linux Operating System, the UNIX operating systems such as System V Unix Operating Systems, BSD Unix Operating Systems, OSF Unix Operating Systems, Sun Solaris Operating Systems, HP/UX Operating Systems, IBM AIX and other operating systems such as IBM Mainframe MVS Operating System (OS/390) and IBM AS/400. Other operating systems may also be used.

The imaging device that includes the embodiment of a user-configurable user interface may be a printer, copier, scanner, facsimile device, multi-functional peripheral, electronic whiteboard, document server, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. An imaging device with a configurable user interface, comprising:
   a touch panel interface;
   a processor;
   memory in electronic communication with the processor;
   instructions stored in the memory, the instructions being executable to:
   enter a user interface edit mode, the user interface edit mode having editing controls that are different than the controls used to control an imaging job, wherein the editing controls modify the presentation of operator controls on the touch panel interface without modifying settings of an imaging job, wherein the operator controls allow settings of the imaging job to be modified;
   present a first set of operator controls on the touch panel interface to a first user for modification;
   receive input from the first user via the first user contacting the touch panel interface to modify the presentation of the first set of operator controls on the touch panel interface without modifying the imaging job;
   create first user interface configuration data based on the input from the first user;
   save the first user interface configuration data under a first username;
   present a second set of operator controls on the touch panel interface to a second user for modification, wherein the second user is different than the first user;
   receive input from the second user via the second user contacting the touch panel interface to modify the presentation of the second set of operator controls on the touch panel interface without modifying the imaging job;
   create second user interface configuration data based on the input from the second user;
   save the second user interface configuration data under a second username;
   exit the user interface edit mode;
   receive, via the touch panel interface, a request from a user to select a user interface configuration;
   display, via the touch panel interface, available user interface configuration data to the user in response to the request, wherein the available user interface configuration data comprises the first user interface configuration data and the second user interface configuration data;
   receive a user selection of configuration data via the user contacting the touch panel interface; and
   present the user interface to the user via the touch panel interface in accordance with the selected configuration data.

2. The imaging device of claim 1, wherein the imaging device is selected from the group consisting of a printer, a facsimile device, a copier, a scanner, a display monitor, an imagesetter, a platesetter, an image store, a filing device, a web publishing device, and a multi-function peripheral device.

3. The imaging device of claim 1, further comprising an embedded web page.

4. The imaging device of claim 1, wherein the editing controls comprise a scroll control, a tab control, a cut control, a copy control and a paste control.

5. The imaging device of claim 1, wherein the instructions are further executable to:
   read the user interface configuration data from the memory before the part of the user interface is presented; and
   save modified user interface configuration data to the memory after receiving the user input.

6. In an imaging device, a method for providing a configurable user interface, comprising:

entering a user interface edit mode, the user interface edit mode having editing controls that are different than the controls used to control an imaging job, wherein the editing controls modify the presentation of operator controls on a touch panel interface on the imaging device without modifying settings of an imaging job, wherein the operator controls allow settings of the imaging job to be modified;

presenting a first set of operator controls on the touch panel interface to a first user for modification;

receiving user input from the first user via the first user contacting the touch panel interface to modify the presentation of the first set of operator controls on the touch panel interface without modifying the imaging job;

creating first user interface configuration data based on the input from the first user;

saving the first user interface configuration data under a first username;

presenting a second set of operator controls on the touch panel interface to a second user for modification, wherein the second user is different than the first user;

receiving input from the second user via the second user contacting the touch panel interface to modify the presentation of the second set of operator controls on the touch panel interface without modifying the imaging job;

creating second user interface configuration data based on the input from the second user;

saving the second user interface configuration data under a second username;

exiting the user interface edit mode;

receiving, via the touch panel interface, a request from a user to select a user interface configuration;

displaying, via the touch panel interface, available user interface configuration data to the user in response to the request, wherein the available user interface configuration data comprises the first user interface configuration data and the second user interface configuration data;

receiving a user selection of configuration data via the user contacting the touch panel interface; and presenting the user interface to the user via the touch panel interface in accordance with the selected configuration data.

7. A non-transitory computer-readable medium comprising executable instructions providing a configurable user interface, the instructions being executable to:

enter a user interface edit mode, the user interface edit mode having editing controls that are different than the controls used to control an imaging job, wherein the editing controls modify the presentation of operator controls on a touch panel interface on the imaging device without modifying settings of an imaging job, wherein the operator controls allow settings of the imaging job to be modified;

present a first set of operator controls on the touch panel interface to a first user for modification;

receive user input from the first user via the first user contacting the touch panel interface to modify the presentation of the first set of operator controls on the touch panel interface without modifying the imaging job;

create first user interface configuration data based on the input from the first user;

save the first user interface configuration data under a first username;

present a second set of operator controls on the touch panel interface to a second user for modification, wherein the second user is different than the first user;

receive input from the second user via the second user contacting the touch panel interface to modify the presentation of the second set of operator controls on the touch panel interface without modifying the imaging job;

create second user interface configuration data based on the input from the second user;

save the second user interface configuration data under a second username;

exit the user interface edit mode;

receive, via the touch panel interface, a request from a user to select a user interface configuration;

display, via the touch panel interface, available user interface configuration data to the user in response to the request, wherein the available user interface configuration data comprises the first user interface configuration data and the second user interface configuration data;

receive a user selection of configuration data via the user contacting the touch panel interface; and present the user interface to the user via the touch panel interface in accordance with the selected configuration data.

8. The non-transitory computer-readable medium of claim 7, wherein the user input is received by the user through the editing controls, the editing controls comprising a scroll control, a tab control, a cut control, a copy control and a paste control.

9. The non-transitory computer-readable medium of claim 7, wherein the instructions are further executable to:

present an option to the user to select a new user interface;
receive user input from the user to select the new user interface;
present the new user interface that was selected by the user.

10. An imaging device with a configurable user interface, comprising:

a processor;
a touch panel interface;
memory in electronic communication with the processor;
user interface configuration data stored in the memory that defines at least a portion of the user interface,
instructions stored in the memory, the instructions being executable to:

enter a user interface edit mode, the user interface edit mode having editing controls that are different than the controls used to control an imaging job, wherein the editing controls modify the presentation of operator controls on the touch panel interface without modifying settings of an imaging job, wherein the operator controls allow settings of the imaging job to be modified;

present a first set of operator controls on the touch panel interface to a first end user for modification, wherein the user interface is broken up into a plurality of parts and the user selects which part of the user interface is presented for modification, wherein the user interface comprises multiple controls that cannot fit onto a single menu;

receive user input from the first end user via the first end user contacting the touch panel interface to modify the presentation of the first set of operator controls on the touch panel interface without modifying the imaging job, wherein modifying the selected part of the user interface comprises removing a control button from a first touch panel menu and placing the control button on a second, different touch panel menu, wherein the first touch panel menu and the second touch panel menu are chained together and navigated using a scroll control, wherein the user removes the control button from the first touch panel menu using a cut control and adds the control button to the second touch panel menu using a paste control;

create first user interface configuration data based on the input from the first end user;

save the first user interface configuration data under a first username;

present a second set of operator controls on the touch panel interface to a second end user for modification, wherein the second end user is different than the first end user;

receive input from the second end user via the second end user contacting the touch panel interface to modify the presentation of the second set of operator controls on the touch panel interface without modifying the imaging job;

create second user interface configuration data based on the input from the second end user;

save the second user interface configuration data under a second username;

exit the user interface edit mode;

receive, via the touch panel interface, a request from an end user to select a user interface configuration;

display, via the touch panel interface, available user interface configuration data to the end user in response to the request, wherein the available user interface configuration data comprises the first user interface configuration data and the second user interface configuration data;

receive the end user's selection of user interface configuration data via the end user contacting the touch panel interface; and present the user interface to the end user via the touch panel interface in accordance with the selected configuration data.

11. The method of claim 6, further comprising automatically recalling the user interface configuration data that was last used by the imaging device.

* * * * *